Patented May 22, 1951

2,554,060

UNITED STATES PATENT OFFICE 2,554,060

STABILIZATION OF POLYMETHYLENE ETHYL METHYL KETONE WITH RESORCINOL DISALICYLATE

Nicholas N. T. Samaras, Longmeadow, Mass., assignor to Monsanto Chemical Company, St. Louis, Mo., a corporation of Delaware No Drawing. Application May 11, 1946, Serial No. 669,102

3 Claims. (Cl. 260—45.85)

This invention relates to new compositions of matter comprising polymeric methylene ethyl methyl ketone and resorcinol disalicylate.

It is an object of this invention to provide light-resistant and weather-resistant plastic compositions. It is a further object of this invention to provide improved compositions of matter comprising polymeric methylene ethyl methyl ketone and resorcinol disalicylate.

The present application is a continuation-in-part of my co-pending application, Serial No. 338,745, filed June 4, 1940, now abandoned.

According to the present invention, compositions comprising polymethylene ethyl methyl ketone and resorcinol disalicylate have been found to possess very useful properties. Outstanding among the valuable characteristics of these new compositions is their resistance to ultra-violet light rays and to outdoor exposure. In these respects, these new compositions are greatly superior to compositions comprising polymethylene ethyl methyl ketone per se.

In preparing the new compositions of the present invention, resorcinol disalicylate can be incorporated in the polymethylene ethyl methyl ketone by any suitable means. Thus, for example, monomeric methylene ethyl methyl ketone can be polymerized in admixture with resorcinol disalicylate. The resorcinol disalicylate can be incorporated in the polymerized methylene ethyl methyl ketone by means of suitable mixing equipment and solution of the polymerized methylene ethyl methyl ketone and the resorcinol disalicylate can be mixed and the solvent subsequently evaporated.

The relative proportions of the two components of the new compositions of the present invention are subject to wide variations. Thus, the valuable properties of the products of this invention are exhibited in compositions in which the proportion of resorcinol disalicylate ranges from substantially 1 part to substantially 50 parts by weight for every 100 parts by weight of polymethylene ethyl methyl ketone. The amount of resorcinol disalicylate that it is desirable to incorporate in the polymethylene ethyl methyl ketone depends, for example, on the particular use to which the material is to be placed. Thus, molding compositions do not generally require as large a proportion of resorcinol disalicylate as do coating compositions. In general, the preferred compositions comprise between substantially 1 part and substantially 25 parts by weight of resorcinol disalicylate for every 100 parts of polymethylene ethyl methyl ketone.

The following are specific examples, illustrating the utility of the new products of the present invention. All parts are parts by weight.

Example 1

A quantity of methylene ethyl methyl ketone, which has the formula,

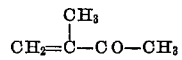

was polymerized at 55° C. for 5 days in a 3% water solution in the presence of a suitable catalyst, for example 2% by weight of hydrogen peroxide. The polymerization product, a solid material, was purified in a suitable manner, as for example, by washing said product with water and alcohol and then drying in a vacuum at substantially 55° C.

Plastic compositions comprising 100 parts of polymethylene ethyl methyl ketone and amounts of resorcinol disalicylate ranging from substantially 1 part to substantially 23 parts, were dissolved in a sufficient quantity of acetone to form individual solutions containing substantially 10% of said plastic compositions.

The above described solutions were applied to glass panels and the resulting films allowed to dry for 48 hours at room temperature. Thereafter, these films were exposed for 12 days to the rays of a General Electric Company S-1 type sun lamp at a distance of substantially 18 inches. An examination showed that after exposure to rays for 14 days, the film comprising only substantially 1 part of resorcinol disalicylate for every 100 parts of polymethylene ethyl methyl ketone, exhibited only a trace of yellowing. The films containing substantially 5 parts or more of resorcinol disalicylate for every 100 parts of polymethylene ethyl methyl ketone, were practically unchanged.

In contrast to the above results, a film comprising polymeric methylene ethyl methyl ketone per se had yellowed considerably after an exposure under identical conditions.

Example 2

Films similar to those described in Example 1 were formed on wood panels and subjected to outdoor atmospheric conditions. The film comprising polymethylene ethyl methyl ketone per se, had turned white and was in a generally poor condition after an outdoor exposure of 4 months. In contrast, the film comprising substantially 1 part of resorcinol disalicylate for every 100 parts of polymethylene ethyl methyl ketone was still in good condition after being subjected to the same exposure conditions. The films containing 5 parts or more of resorcinol disalicylate for every 100 parts of polymethylene ethyl methyl ketone, showed no change as a result of this exposure.

The hereinbefore described specific examples are solely illustrative of the unforseen and valuable products of the present invention. Examples 1 and 2 illustrate the effectiveness of these new compositions for coating and impregnating solutions and the like. However, as is evident to those skilled in the art, there are other uses for compositions comprising polymeric methylene ethyl methyl ketone and resorcinol disalicylate, as for example, for molding compositions. Furthermore, the scope of the present invention comprises these new compositions whether employed alone or in admixture with other materials. In addition, compositions comprising resorcinol disalicylate and co-polymers of polymethylene ethyl methyl ketone and other polymerizable materials are included within the scope of this invention.

This invention is limited solely by the claims attached hereto.

I claim:

1. A process of improving the stability of polymethylene ethyl methyl ketone which is normally light and weather unstable comprising incorporating therein 1 to 25% of resorcinol disalicylate.

2. A composition of matter possessing increased resistance to the influences of light and weather comprising normally light and weather unstable polymethylene ethyl methyl ketone and 1 to 25% of resorcinol disalicylate.

3. A composition of matter possessing increased resistance to the influences of light and weather comprising normally light and weather unstable polymethylene ethyl methyl ketone and 5 to 25 parts of resorcinol disalicylate per 100 parts of polymethylene ethyl methyl ketone.

NICHOLAS N. T. SAMARAS.

REFERENCES CITED

The following references are of record in the file of this patent:

UNITED STATES PATENTS

| Number | Name | Date |
|---|---|---|
| 2,407,051 | Adelson et al. | Sept. 3, 1946 |